United States Patent [19]

Carnall, Jr. et al.

[11] 3,803,044

[45] Apr. 9, 1974

[54] POLYCRYSTALLINE CHALCOGENIDE SPINELS

[75] Inventors: Edward Carnall, Jr.; Donald Pearlman, both of Rochester, N.Y.

[73] Assignee: Eastman Kodak Company, Rochester, N.Y.

[22] Filed: Sept. 20, 1971

[21] Appl. No.: 181,992

[52] U.S. Cl.................. 252/300, 423/508, 423/511
[51] Int. Cl............................ F21v 9/02, G02b 5/20
[58] Field of Search........ 252/300, 69, 51; 423/508, 423/511

[56] References Cited

UNITED STATES PATENTS

| | | | |
|---|---|---|---|
| 3,480,409 | 11/1969 | Dillon, Jr. et al.................. | 332/7.51 |
| 3,476,690 | 11/1969 | Carnall, Jr. ......................... | 252/300 |
| 3,448,053 | 6/1969 | Haacke et al..................... | 252/62.51 |

FOREIGN PATENTS OR APPLICATIONS

| | | | |
|---|---|---|---|
| 1,146,481 | 3/1969 | Great Britain...................... | 423/508 |

OTHER PUBLICATIONS

Lee, Journal of Applied Physics, Vol. 42, No. 4, March 15, 1971, pages 1441–1442.

Ahrenpill et al., Journal of Applied Physics, Vol. 42, No. 4, March 15, 1971, pages 1452–1453.

Akamato et al., Ayo Butsuri 39, (5) 471–479 (1970) Translation by McElroy Co.

Materials Science Research (Palmoon et al.), Vol. 4, 1969, pages 404–407.

*Primary Examiner*—Norman G. Torchin
*Assistant Examiner*—J. P. Brammer

[57] ABSTRACT

This invention relates to solid polycrystalline chalcogenide spinel elements exhibiting useful magneto-optical properties. The elements have a density of at least 99 percent of theoretical density and exhibit optical transparency in at least some portion of the electromagnetic spectrum extending from about 800 nm to about 50 microns.

7 Claims, 3 Drawing Figures

EDWARD CARNALL JR.
DONALD PEARLMAN
INVENTORS

BY Ronald P. Hilst

ATTORNEY

POLYCRYSTALLINE CHALCOGENIDE SPINELS

This invention relates to polycrystalline chalcogenide spinel elements having useful magneto-optical properties and a hot-pressing process for making such elements.

Reference is made to Pearlman et al., Docket 35,08-8.0, U.S. Pat. application Ser. No. 182,128 entitled "Chalcogenide Spinel Powders", filed Sept. 20, 1971. Reference is also made to Carnall, Jr., U.S. Pat. No. 3,476,690 issued Nov. 4, 1969. Both of the foregoing documents are hereby incorporated into the present application by reference thereto.

In the past, it has been recognized that certain chalcogenide spinel crystalline materials exhibit useful magneto-optical properties. For example, U.S. Pat. No. 3,480,409 shows a method of preparing cadmium chromium selenide crystals having desirable magneto-optical properties. The use of certain other chalcogenide spinel crystals exhibiting optical transparency in the infrared portions of the spectrum has also been recognized. (See *Materials Science Research*, Vol. 4, Plenum Press, New York (1969), page 404, FIG. 4, reference 23.) However, in the past the art has been unable to prepare polycrystalline chalcogenide spinel materials which exhibit magneto-optical properties and has been confined to the use of single crystals of these chalcogenide spinel materials. Although the art has been able to produce relatively large crystals having a size on the order of several milimeters, there is, to applicants' knowledge, no satisfactory method for preparing polycrystalline chalcogenide materials which possess the useful magneto-optical properties exhibited by single crystals of certain chalcogenide spinel materials.

For purposes of reviewing the state of the art relative to methods of preparing chalcogenide spinel crystals, reference may be made to a recent article entitled "Growth Method and Properties of Magnetic Semiconducting Crystals of the Chalcogenide Spinel" by F. Okamoto, T. Takahashi, and Y. Wada employed at R.C.A. Basic Research Center in Japan and published in Oyo Butsuri 39, 471–479 (1970). (An English translation by the Ralph McElroy Co., Custom Division, 504 West 24th Street, Austin, Texas 78705 is available.) Other publications available relating to preparation of magnetic chalcogenide spinels include an article by G. Lapluye and L. Abello in *Bulletin Societe Chimique de France*, 1963, page 1062 and British Patent 1,146,481. Apparently, the methods described in the latter two publications fail to yield optically transparent chalcogenide spinel elements since there is no mention made in either of these two publications concerning optical transparency of the resultant materials. In addition, it would appear that the methods described in the latter two publications, although suitable for preparing magnetic chalcogenide spinel powders, may not be suitable for preparing polycrystalline chalcogenide spinel materials.

According to the present invention there are provided solid, unitary, polycrystalline chalcogenide spinel elements exhibiting valuable magneto-optical properties which render these elements useful as laser modulators, infra-red transmission windows, etc.

Typical of these elements of the invention are polycrystalline elements which exhibit magneto-optical properties and which consist essentially of finely-divided contiguous particles of one or more chalcogenide spinels having the formula:

$$ACr_2X_4$$

wherein A is a metal typically selected from Periods 2 to 6 of Groups IA to IVA and IB to VIIIB of the Periodic Table. A may be further defined as a divalent cation, or a suitable mixture of univalent and trivalent cations having a net divalent cationic charge. According to especially preferred embodiments of the invention A is selected from cations of manganese, copper, iron, mercury, cobalt, cadmium and mixtures thereof. In the above-noted formula Cr, of course, is a trivalent cation of chromium; X is a divalent chalcogenide anion of sulfur, selenium, mixtures of sulfur and selenium, mixtures of sulfur and tellurium, mixtures of selenium and tellurium, and mixtures of sulfur, selenium and tellurium.

According to a preferred embodiment of the invention, there are provided polycrystalline elements of $CdCr_2S_4$ or $CdCr_2Se_4$, a 40 micron thick sample of which exhibits greater than about 20 transmittance of incident light having a wavelength within the range of 1.0 to 10 microns.

The above-described magneto-optical chalcogenide spinel polycrystalline materials are prepared according to the present invention by hot-pressing under inert conditions a powder of chalcogenide spinel particles having the formula:

$$ACr_2X_4$$

(wherein A and X are as defined hereinabove) under a pressure of at least about 4,000 psi at a temperature of about or below the decomposition temperature of the chalcogenide spinel powder.

The invention will be further understood by reference to the following detailed description and drawings in which.

Figure 1:
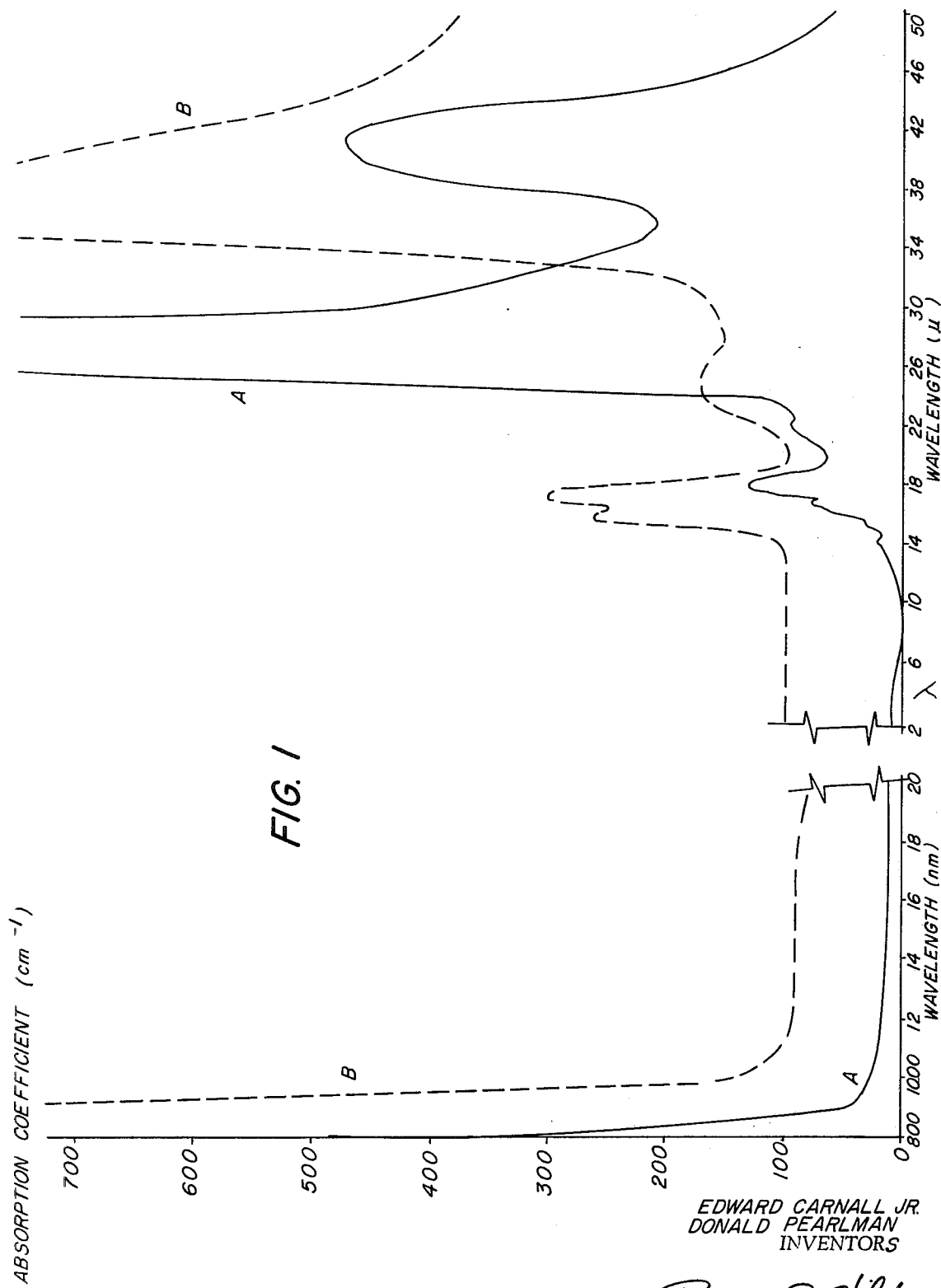
FIG. 1 illustrates the optical transparency of typical polycrystalline cadmium chromium sulfide and cadmium chromium selenide elements of the present invention in terms of a graph in which the absorption coefficients of the elements are shown as a function wavelength ($\lambda$).

As suggested hereinabove the advantages of the chalcogenide spinel elements of the present invention include a discovery that polycrystalline chalcogenide spinel materials having magnetic properties and optical transparency may be prepared. In addition, it should be noted that although hot-pressing has been used extensively in the art to prepare, for example, infrared transmitting elements of binary materials (e.g. see U.S. Pat. Nos. 3,294,878; 3,365,271; 3,359,066; 3,131,125; 3,313,238; 3,475,116; 3,453,215; and etc.) there has been relatively only limited hot-pressing of ternary compounds. [See *Materials Science Research*, Vol. 4, Plenum Press, New York (1969), page 404, FIG. 4, reference 23. In this article magnesium aluminum oxide, i.e. $MgAl_2O_4$, was pressed to theoretical density.] Moreover, applicants' discovery that the polycrystalline, magneto-optical chalcogenide spinel materials of the present invention can be hot-pressed at a relatively low pressure on the order of about 4,000 psi represents a quite unexpected discovery in view of the prior art relating to the hot-pressing of various binary compounds which generally utilize a hot-pressing pressure of at least two or more times greater than that used in the process of the present invention. Of course, another major advantage of the invention is that one can prepare relatively large chalcogenide crystalline elements, substantially larger than single crystals of chalcogenide spinels. A further advantage of the invention is the surprising discovery that certain of the magneto-optical polycrystalline chalcogenide spinel materials of the present invention exhibit greater optical transparency than that previously reported in the art for single crystals of similar chalcogenide materials and can generally be prepared in much shorter times. Generally, the polycrystalline elements of the invention can be prepared in times of from about 1 to 25 minutes to less than about 3 hours.

The polycrystalline chalcogenide spinel elements of the present invention are substantially voidless and, therefore, contain no noticeable infrared radiation scattering sites. The polycrystalline elements of the present invention have a density of at least 99 percent of the theoretical density of a single crystal as calculated from the crystal lattice constants reported for single crystals. The powder chalcogenide spinel particles from which the polycrystalline elements of the present invention are prepared should be substantially pure. Impurities in these chalcogenide spinel powders used in the process of the present invention can result in impurities in the final polycrystalline product and therefore impair its optical transparency. (If, however, it is unnecessary to have maximum transparency in a certain application, polycrystalline elements of the invention having a certain amount of impurities present may still be useful.) The optical transparency of the polycrystalline chalcogenide spinel elements of the present invention may be accounted for by the fact that the resultant article has an extremely high density close to theoretical density, i.e. is substantially voidless, and thus consists essentially of compacted chalcogenide spinel powder. Since substantially pure chalcogenide spinel powder has a cubic crystallographic structure, it will be appreciated that this powder is optically isotropic.

Because the optical properties in the polycrystalline materials developed in accordance with this invention are in many respects similar to those of a single crystal of the same material, the distinguishing features should be precisely defined. Without the use of optical instruments, one difference between single crystals and certain of the polycrystalline elements of the present invention is the increased structural strength exhibited by certain of the polycrystalline materials. This increased structural strength may be accounted for theoretically due to the reduction of the effect of planes of cleavage which cause weakness in single crystals. These planes of cleavage do not weaken the hot pressed polycrystalline form of material because, compared to the single crystal, the crystal grains of the polycrystalline material are too small and are not uniformly oriented with each other. That is, while each individual grain has a crystal lattice within it, the grains themselves are randomly oriented in respect to each other within the polycrystalline element. Any planes of cleavage, then, are no bigger than individual grains. This is believed to be the reason why the material is stronger than single crystalline materials.

It is known that so-called "single crystals" are generally not "single" in the strict sense of the word since at least a few low angle grain boundaries generally develop in the formation of the crystal. On the other hand, in the process of hot pressing, certain grain growth and alignment of crystals may under certain conditions take place. Nevertheless, any substantial thickness, e.g., one cm., of the polycrystalline material will have an apparent random orientation when compared to a single crystal of the same size.

Demonstration of the structure of hot pressed polycrystalline material including this lack of overall uniform orientation is conveniently made by X-ray diffraction techniques. As is well known, a single crystal placed at a particular angle of orientation to an X-ray beam will, by optical interference, either reflect the radiation striking it or not, depending upon whether the crystal is placed with its lattice oriented at a characteristic angle for that wavelength and that particular type of crystal. However, when a polycrystalline substance is placed in the X-ray beam, all reflections characteristic of the material are seen at one time without rotation (or reorientation) of the material. The latter behavior indicates that there are grains of the material oriented in all possible directions. The few low angle grain boundaries which may develop in single crystals do not have this effect of creating characteristic planes running in all directions.

Further evidence of the polycrystalline nature of the material produced according to the invention may be shown by photomicrographs, preferably electron micrographs of cross-sections of the material, which show a large number of grain boundaries randomly coalesced. The number of grain boundaries per linear millimeter in high quality polycrystalline material can vary from less than 10 to more than 5,000, but in any significant thickness, e.g., one centimeter, the grains must be considered randomly oriented.

Thus, the term "single crystal" as used herein includes objects which are in fact single crystals and also crystalline objects in which a few grain boundaries have developed due to crystal pulling. The term "polycrystalline", on the other hand, refers to crystalline material in which, for example, in a one cm. thickness thereof, the grain orientation as evidenced by X-ray diffraction is random.

Typically, the optical transparency of the polycrystalline elements of the present invention occurs in a portion of the electromagnetic spectrum extending from about 800 nanometers to about 50 microns. Curves A and B, for example, of FIG. 1 show the absorption coefficient of polycrystalline cadmium chromium sulfide ($CdCr_2S_4$) and cadmium chromium selenide ($CdCr_2Se_4$), respectively, prepared as described hereinafter in the Examples. The absorption coefficient, $\alpha$, is expressed in $cm^{-1}$ and may be defined as follows: $\alpha = 2.3D/t$, where D is the specular optical density of a sample of thickness $t$, corrected only for reflection loss.

This coefficient is therefore a measure of all optical loss in the sample, excluding reflection. These materials are typical of the polycrystalline elements of the present invention. It should be noted, however, that the range of optical transparency of a particular polycrystalline element may be varied somewhat below or above the spectral range noted hereinabove by appropriate selection of the particular A component and X components of the element. In addition, the lower range of optical transparency of these elements may be shifted by cooling, e.g. to temperatures at or below liquid nitrogen. Generally, the selenide and telluride-containing polycrystalline elements of the present invention have an optical transparency which is shifted toward the upper end of the above-noted spectral range, i.e. the 50 micron area of the spectrum. On the other hand, the sulfide-containing elements of the present invention tend to exhibit transparency in a range which is shifted toward the lower end, i.e. the 800 nm area of the spectrum. In addition, the optical transmission of the elements of the invention can be influenced by appropriate selection of the particular components comprising the A component of the polycrystalline element. The particular temperature and pressure at which the polycrystalline elements of the present invention are hot-pressed also may have an effect on the optical transmission of the polycrystalline product. It will be observed that generally the elements of the present invention are optically transparent in the near-infrared and infrared portions of the spectrum. In certain cases, certain of these elements may exhibit an optical transparency in the far visible portion of the spectrum or in the far infrared portion of the spectrum. As noted above, this generally is accomplished by appropriately selecting the particular A and X components of the polycrystalline element as well as by the selection of a particular pressure and temperature at which the element is hot-pressed. As indicated above, a distinct advantage of the present invention resides in the relatively high degree of optical transparency exhibited by the polycrystalline elements of the present invention. For example, from a theoretical standpoint one would expect that single crystals of the chalcogenide spinel materials used in the invention would exhibit a higher degree of optical transparency than polycrystalline elements of these same materials. However, to date, to applicants' knowledge, polycrystalline materials of the present invention, specifically $CdCr_2S_4$ polycrystalline elements, have been prepared which exhibit a higher degree of optical transparency than that of single crystals of $CdCr_2S_4$ previously reported in the art. For example, applicants have prepared polished cylindrical polycrystalline $CdCr_2S_4$ elements of the invention having a thickness of 40 microns and a 2.5 cm diameter which exhibit 82.5 percent transmittance to 2.0 micron wavelength light. (This transmittance value was measured while the 40 micron thick sample was cemented to a ¼ inch thick piece of polished glass having a refractive index of 1.5.)

Figure 2:
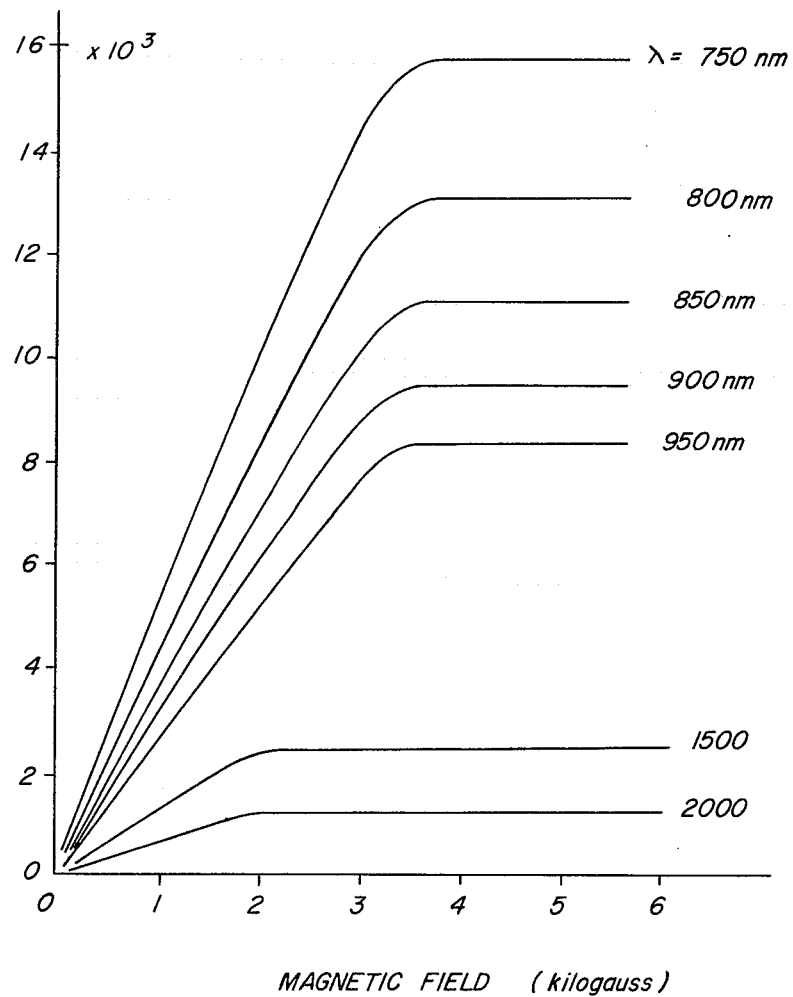
FIG. 2 illustrates the magneto-optical properties exhibited by a typical polycrystalline cadmium chromium sulfide element of the invention in the presence of an applied magnetic field. The graph of FIG. 2 shows the rotation of the vibrational plane of a polarized light beam passing through the element as a function of applied magnetic field strength.
Figure 3:
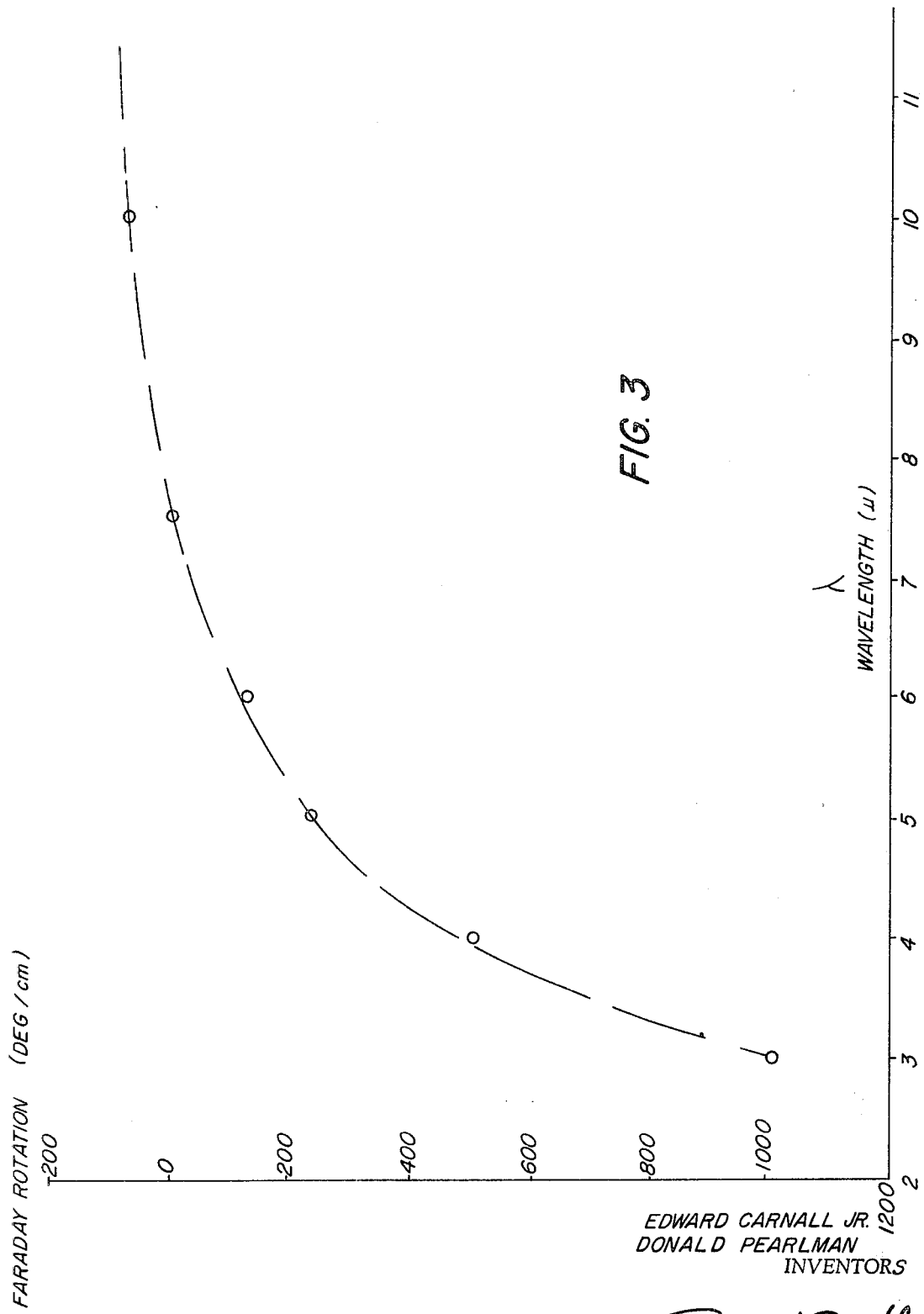
FIG. 3 illustrates the magneto-optical properties exhibited by a typical polycrystalline cadmium chromium selenide element of the invention in the presence of an applied magnetic field. The graph of FIG. 3 shows the rotation of the vibrational plane of a polarized light beam passing through the element as a function of wavelength.

The polycrystalline chalcogenide spinel elements of the present invention may exhibit either ferromagnetic properties or ferrimagnetic properties. Typical ferromagnetic materials of the present invention include polycrystalline elements of cadmium chromium sulfide, cadmium chromium selenide, mercury chromium selenide, mercury chromium sulfide and cadmium chromium sulfoselenide, i.e. $CdCr_2S_xSe_{4-x}$ where X is 0 to 4. Typical ferrimagnetic polycrystalline elements of the present invention include manganese chromium sulfide, iron chromium sulfide, cobalt chromium sulfide, copper iron chromium sulfide, and copper cobalt chromium sulfide. The magnetic properties of the polycrystalline element of the present invention are due to the presnece of the chromium component of the chalcogenide spinel element. To illustrate the magnetic effect of typical polycrystalline elements of the present invention and the magneto-optical properties of these elements, reference may be made to FIGS. 2 and 3. FIG. 2 shows the Faraday rotation in degrees per centimeter (Deg./cm) as a function of magnetic field (measured in kilogauss) of a typical cadmium chromium sulfide polycrystalline element of the present invention prepared as described in Example 1. Faraday rotation shown in FIG. 2 is measured at several different wavelengths (λ) as indicated. The Faraday rotation shown in FIG. 2 was measured on a cadmium chromium sulfide polycrystalline element maintained at 4.2°K. FIG. 3 illustrates the Faraday rotation of a polycrystalline cadmium chromium selenide element of the present invention as measured at 82°K as a function of wavelength. The element investigated in FIG. 3 was prepared as described in Example 2. The Faraday rotation exhibited by the magneto-optical materials of the present invention is an extremely valuable property. These polycrystalline elements, when placed in a magnetic field, displace or rotate the plane of vibration of a polarized light beam which is transmitted through the element in the direction of the magnetic field. Thus, a polarized beam of light entering such an element which is in the presence of a magnetic field will exit the element with a different plane of polarization. For example, if the thickness of the polycrystalline element is suitably chosen, the plane of polarization of a light beam passing through the element may be rotated 90°.

As stated hereinabove, the polycrystalline elements of the present invention are prepared by hot pressing. Hot pressing as is shown in the art generally involves a compacting process accomplished under heat and pressure. To produce polycrystalline elements of the present invention having optimum properties, the polycrystalline elements should be produced from powder particles of substantially the same nature. For example, to prepare a polycrystalline cadmium chromium sulfide element of the present invention one would hot press a mixture of powdered cadmium chromium sulfide having a substantially uniform and homogeneous nature. One preferred method for making such chalcogenide spinel powder useful as a starting material in the hot-pressing process of the present invention is described in the Pearlman et al. patent application referenced hereinabove. Alternatively, a mixture of single chalcogenide spinel crystals may be used to produce a uniform, homogeneous chalcogenide spinel powder useful as a starting material in the process of the invention. The size range of the particulate chalcogenide material used as a starting powder for the process of the present invention may vary. It is believed that as the particle size of the powder decreases there should generally be produced a resultant increase in the strength of the final polycrystalline product. Typically a powder having a B.E.T. surface area on the order of about 0.6 m²/g to about 3 m²/g may be used as starting materials.

To form the polycrystalline elements of the present invention, an inert closed die is used to confine the chalcogenide spinel powder particles while subjecting this charge of particles to pressure and relatively high temperatures. Since the charge consists of powdered particles, it will readily adapt to substantially the shape defined by the pressing die before pressing. After pressing, it will accurately conform to the shape of the dies. Thus, the present invention provides versatility in producing magneto-optical elements in shapes of lenses, domes, or other configurations which may be desired. If the die, is accurately formed and carefully polished, the pressed chalcogenide spinel element of the invention may be pressed in blank or rough form and worked with conventional optical glass forming and polishing methods.

According to the present invention, the chalcogenide spinel powder charge is heated to a temperature about or below the decomposition temperature of the chalcogenide spinel powder starting material. Typically, this is a temperature within the range of about 400°C to about 1,200°C. Of course, it will be appreciated that the particular temperature will vary depending on the particular A and X components of the chalcogenide spinel powder being hot-pressed. For example, a preferred pressing temperature range for the hot-pressing of cadmium chromium sulfide is a temperature within the range of from about 750°C to about 900°C. On the other hand, a preferred pressing temperature for hot-pressing cadmium chromium selenide is a temperature within the range of from about 700°C to about 800°C. The optimum pressing temperature will also vary somewhat depending upon the history of the particular chalcogenide spinel starting powder.

The pressure at which the chalcogenide spinel polycrystalline elements of the invention are prepared also may be varied. Generally, a pressure of at least 4,000 psi should be utilized. As noted hereinabove, the discovery that the polycrystalline chalcogenide spinel elements of the present invention may be hot pressed utilizing a pressure as low as 4,000 psi is itself quite unexpected. As noted, much higher pressures have generally been used to produce hot pressed elements from binary compounds. Thus, the fact that the chalcogenide spinel materials of the present invention may be pressed at a pressure as low as about 4,000 psi represents a further advantage of the hot pressing process of the present invention. Of course, pressures much higher than 4,000 psi may be utilized; however, there is generally little if any improvement in the hot-pressed product utilizing a pressure much higher than about 75,000 psi. Moreover, as higher pressures are used, one is required to utilize stronger dies which generally means an increase in the cost of the die. Thus, extremely high pressures are not recommended as there is little if any improvement in result and there may be a substantial increase in the cost of the hot-pressing apparatus capable of generating such high pressures. Typically, the polycrystalline elements of the present invention are pressed at a pressure within the range of from about 5,000 to about 50,000 psi. The particular pressure utilized will depend, in part, on the particular chalcogenide spinel powder being hot-pressed. As will be apparent to those skilled in the art, the particular temperature utilized will also have an effect on the particular pressure selected and vice versa. For example, if a rather high pressing temperature is used a lower pressing pressure may be used. For a given temperature or pressure selected, the corresponding optimum pressure or temperature may be readily established simply by running a series of pressings at different pressures or temperatures and choosing the pressure or temperature which yields the desired result.

According to a preferred embodiment of the present invention, the chalcogenide spinel powder is first subjected to a cold pressing operation before being hot pressed. Cold pressing is typically accomplished at room temperature and at a pressure of from about 1,000 to about 8,000 psi, preferably 4,000 to 6,000 psi. The purpose of cold pressing is to initially compact the powder and improve heat transfer.

The hot pressing process of the present invention is effected under inert or evacuated conditions. Preferably, hot pressing is effected under vacuum conditions utilizing a vacuum of about 50 to 150 microns of mercury. The pressing process may be carried out in any apparatus capable of meeting the operating parameters described herein. A preferred apparatus for carrying out the pressing process is described in U.S. Pat. No. 3,476,690 referenced hereinabove and illustrated in FIGS. 2–4 thereof.

The practice of the invention may be further illustrated by means of the following examples:

EXAMPLE 1

6.0 grams of cadmium chromium sulfide prepared as described in Example 1 of Pearlman et al., U.S. patent application Ser. No. 182,128, referenced hereinabove, is used to prepare a polycrystalline element of the present invention as follows: The powder is placed in a pressing cylinder between pieces of pyrolytic graphite and cold pressed at 5,000 psi. The cylinder is then placed in the hot pressing apparatus described in U.S. Pat. No. 3,476,690 and the apparatus is evacuated to 50–150 microns. 20,000 psi pressure is then applied to the ram and heating begun. The temperature is raised to 900°C over a 20 minute period and after reaching this temperature it is maintained for 10 minutes. Next the pressure is increased 2,500 psi/min up to a maximum of 40,000 psi, still at 900°C. This maximum temperature and pressure is maintained for 20 minutes. At the end of the time period the heat is shut off and the pressued reduced at 5,000 psi/50°C at which time the vacuum pump is shut off and the apparatus back filled with inert gas and the remaining pressure released so that cooling from 650°C to room temperature is carried out without any applied pressure.

The pressed sample in the form of a cylinder 0.26 cm high and 2.5 cm in diameter is removed from the cylinder and then ground and polished to the desired thickness using conventional glass polishing techniques.

The following table shows the results of several pressings run at different temperatures or times showing density (% of theoretical) and transmittance at two wavelengths. [These transmittance values were measured on a 40 micron thick polished sample while still cemented to a ¼ inch thick piece of polished glass having a refractive index of 1.5.]

TABLE I

| Sample No. | Temperature | Time at Max. Temperature and Pressure | Pressure | % Density | Transmittance $1.3\mu$ | $2.0\mu$ |
| --- | --- | --- | --- | --- | --- | --- |
| 1 | 750°C | 20 minutes | 40,000 psi | 99.69 | 63.5% | 73.2% |
| 2 | 800°C | 20 minutes | 40,000 psi | 99.82 | 74 | 81.3 |
| 3 | 850°C | 20 minutes | 40,000 psi | 99.87 | 75 | 80.5 |
| 4 | 900°C | 20 minutes | 40,000 psi | 99.99 | 77.5 | 82.5 |
| 5 | 900°C | 60 minutes | 40,000 psi | 99.92 | 73 | 79.5 |

FIG. 1, Curve A shows the absorption coefficient vs. wavelength using cadmium chromium sulfide samples prepared as described above varying from 0.02 mm to 2 mm thick. The refractive index of polycrystalline $CdCr_2S_4$ has been measured and the results are shown in the following table:

TABLE II

| Wavelength of Incident Light | Refractive Index |
| --- | --- |
| 800 nm | 3.86 |
| 850 nm | 3.75 |
| 900 nm | 3.58 |
| 950 nm | 3.46 |
| 1000 nm | 3.37 |
| $1.2\ \mu$ | 3.13 |
| $1.5\ \mu$ | 2.97 |
| $2.0\ \mu$ | 2.89 |
| $2.5\ \mu$ | 2.86 |
| $5\ \mu$ | 2.84 |
| $10\ \mu$ | 2.84 |
| $15\ \mu$ | 2.84 |

EXAMPLE 2

6.0 grams of cadmium chromium selenide prepared as described in Example 11 of Pearlman et al., U.S. patent application Ser. No. 182,128, referenced hereinabove, is used to prepare a polycrystalline element of the present invention as follows: The powder is placed in a pressing cylinder between pyrolytic graphite discs and cold pressed at 5,000 psi. The cylinder is then placed in the hot pressing apparatus and the apparatus is evacuated to 50–150 microns. No pressure is applied to the ram at this time. The temperature is raised to 500°C over a 12 minute period. After reaching this temperature, the temperature is maintained constant for 10 minutes. Next the pressure is increased at about 8,000 psi per minute up to a maximum of 25,000 psi. Next, the temperature is raised to 700°C and pressure increased to 50,000 psi and the conditions maintained for 20 minutes. At the end of this time period the heat is shut off and the pressure reduced to about 5,000 psi/50°C until 650°C at which point the vacuum pump is shut off and the apparatus back-filled with an inert gas and the remainint pressure released so that cooling from 650°C to room temperature is carried out without applied pressure.

The pressure sample in the form of a cylinder 0.209 cm high and 2.5 cm in diameter is removed from the cylinder and ground and polished to the desired thickness using conventional glass polishing techniques.

The following table shows the transmittance of various 40 micron thick samples of polycrystalline $CdCr_2Se_4$ pressed at different temperatures and density.

TABLE III

| Sample No. | Temperature | % Transmission of 2.5 incident light | Density |
| --- | --- | --- | --- |
| 1 | 650°C | 22% | |
| 2 | 700°C | 21% | 5.671 g/cc |
| 3 | 750°C | 41% | 5.674 g/cc |
| 4 | 800°C | 51% | 5.676 g/cc |

Density values of cadmium chromium selenide calculated from the lattice constants found in the literature range from 5.652 – 5.738 g/cc so that there is considerable uncertainty as to what the theoretical density of cadmium chromium selenide is. This may be due to the spinel having an appreciable range of homogeneity and that the variation in lattice constant is due to differences in sample composition.

The refractive index of the polycrystalline $CdCr_2Se_4$ is higher than the corresponding sulfide compound and the index at 2.5 microns is estimated to be 3.03.

The invention has been described in detail with particular reference to preferred embodiments thereof, but it will be understood that variations and modifications can be effected within the spirit and scope of the invention.

We claim:

1. A magneto-optical polycrystalline unitary solid consisting essentially of contiguous finely-divided particles of one or more chalcogenide spinels having the formula:

$ACr_2X_4$ wherein A is a divalent cation, or a mixture of univalent and trivalent cations having a net divalent charge, of a metallic material selected from Periods 2–6 of Groups IA to IVA and IB to VIIIB of the Periodic Table;

wherein X is a divalent anion of a chalcogen selected from the group consisting of sulfur, selenium, mixtures of sulfur and selenium, mixtures of sulfur and tellurium, mixtures of selenium and tellurium, and mixtures of sulfur, selenium, and tellurium;

said solid having a density of at least 99 percent of theoretical density and exhibiting optical transparency in at least some portion of the electromagnetic spectrum extending from about 800 nm to about 50 microns.

2. A polycrystalline solid according to claim 1 wherein A is selected from the group consisting of manganese, copper, iron, mercury, cobalt, cadmium and mixtures thereof.

3. A polycrystalline solid according to claim 1 wherein X is sulfur, selenium, or mixtures thereof.

4. A polycrystalline solid according to claim 1 wherein A is cadmium, and X is sulfur or selenium.

5. A magneto-optical polycrystalline unitary solid consisting essentially of contiguous finely-divided particles of one or more chalcogenide spinels having the formula:

$ACr_2X_4$ wherein A is a divalent cation, or a mixture of univalent and trivalent cations having a net divalent charge, of a metallic material selected from the group consisting of cobalt, cadmium, and mixtures thereof;

wherein X is sulfur;

said solid having a density of at least 99 percent of theoretical density and exhibiting optical transparency in at least some portion of the electromagnetic spectrum extending from about 800 nm to about 50 microns.

6. A magneto-optical polycrystalline unitary solid consisting essentially of contiguous finely-divided particles of a chalcogenide spinel having the formula $CdCr_2S_4$, said solid having a density of at least 99 percent of theoretical density and exhibiting optical transparency in at least some portion of the electromagnetic spectrum extending from about 800nm. to about 50 microns.

7. A magneto-optical polycrystalline unitary solid consisting essentially of contiguous finely-divided particles of a chalcogenide spinel having the formula $CoCr_2S_4$, said solid having a density of at least 99 percent of theoretical density and exhibiting optical transparency in at least some portion of the electromagnetic spectrum extending from about 800nm. to about 50 microns.

* * * * *